(12) United States Patent
Deguchi et al.

(10) Patent No.: US 6,428,196 B1
(45) Date of Patent: Aug. 6, 2002

(54) BEAM ANGLE ADJUSTING DEVICE FOR VEHICULAR HEADLAMP

(75) Inventors: Hirohisa Deguchi; Nobumi Yokoyama, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 59 days.

(21) Appl. No.: 09/676,568

(22) Filed: Oct. 2, 2000

(30) Foreign Application Priority Data

Sep. 30, 1999 (JP) ............................................. 11-278755
Jul. 12, 2000 (JP) ......................................... 2000-210956

(51) Int. Cl.⁷ .......................................... F21W 101/10
(52) U.S. Cl. ...................................... 362/515; 362/514
(58) Field of Search ................................. 362/514, 515, 362/284, 282, 322, 324

(56) References Cited

U.S. PATENT DOCUMENTS 4,916,587 A   4/1990   Hirose et al.
5,908,239 A * 6/1999   Sugimoto .................... 362/515

FOREIGN PATENT DOCUMENTS

| EP | 0 716 954 A2 | 6/1996 | ........... B60Q/1/076 |
| GB | 2 253 900 B | 9/1992 | ........... F21M/3/18 |
| GB | 2 283 556 B | 5/1995 | ........... F16H/57/02 |
| GB | 2 283 564 B | 5/1995 | ........... F21M/3/20 |

* cited by examiner

*Primary Examiner*—Laura K. Tso
(74) *Attorney, Agent, or Firm*—Sughrue Mion, PLLC

(57) ABSTRACT

A beam angle adjusting device for a vehicular headlamp having a reduced size, especially a reduced thickness of the case body of the device. The beam angle adjusting device is provided with a case body, a motor disposed inside the case body, and a shaft which moves in the front/rear direction in response to rotation of the motor, wherein the motor and a circuit member which has a terminal for supplying power are arranged in symmetrical positions in relation to a plane containing the shaft.

11 Claims, 12 Drawing Sheets

FIG. 1

BEAM ANGLE ADJUSTING DEVICE FOR VEHICULAR HEADLAMP

FIELD OF THE INVENTION

The present invention relates to a beam angle (irradiation angle) adjusting device for a vehicular headlamp. More specifically, the present invention relates to a beam angle adjusting device having a reduced size.

BACKGROUND OF THE INVENTION

There has previously been known a beam angle adjusting device for vehicular headlamps which is provided with an adjusting screw connected with a tilting member, the tilt angle of which determines the beam angle of the irradiated light, a shaft for supporting the adjusting screw and which is non-rotatable but movable in the axial direction, and a worm wheel which is supported by a case body rotatable but immovable in the axial direction and which is threadedly joined with the shaft.

In a beam angle adjusting device for a vehicular headlamp of this type, when the worm wheel is rotated by a remotely controlled motor, the adjusting screw supporting shaft, which is threadedly connected to the worm wheel, is moved in the axial direction. The tilt angle of the tilting member is then adjusted via the adjusting screw supported by the adjusting screw supporting shaft, which changes the beam angle of the irradiated light.

In a conventional beam angle adjusting device for a vehicular headlamp, because the motor and a circuit board containing a connector are arranged serially in the longitudinal direction of the adjusting screw supporting shaft, the case containing the device tends to be thick.

Accordingly, it is an object of the present invention to reduce the size, and particularly, to reduce the thickness of the case body.

SUMMARY OF THE INVENTION

In order to solve the abovementioned problem, in a beam angle adjusting device for a vehicular headlamp of the present invention, the motor and the circuit member, including terminals for supplying power, are arranged in symmetrical positions in relation to a plane containing the adjusting screw supporting shaft.

Accordingly, in the case of the beam angle adjusting device for a vehicular headlamp of the present invention, because the motor and the printed circuit board are arranged side by side, the case body can be made smaller. Also, due to the fact that the heights of the power supply terminals and the case can be made the same, the thickness of the case body can be reduced.

BRIEF DESCRIPTION OF THE DRAWINGS

Figure 1:
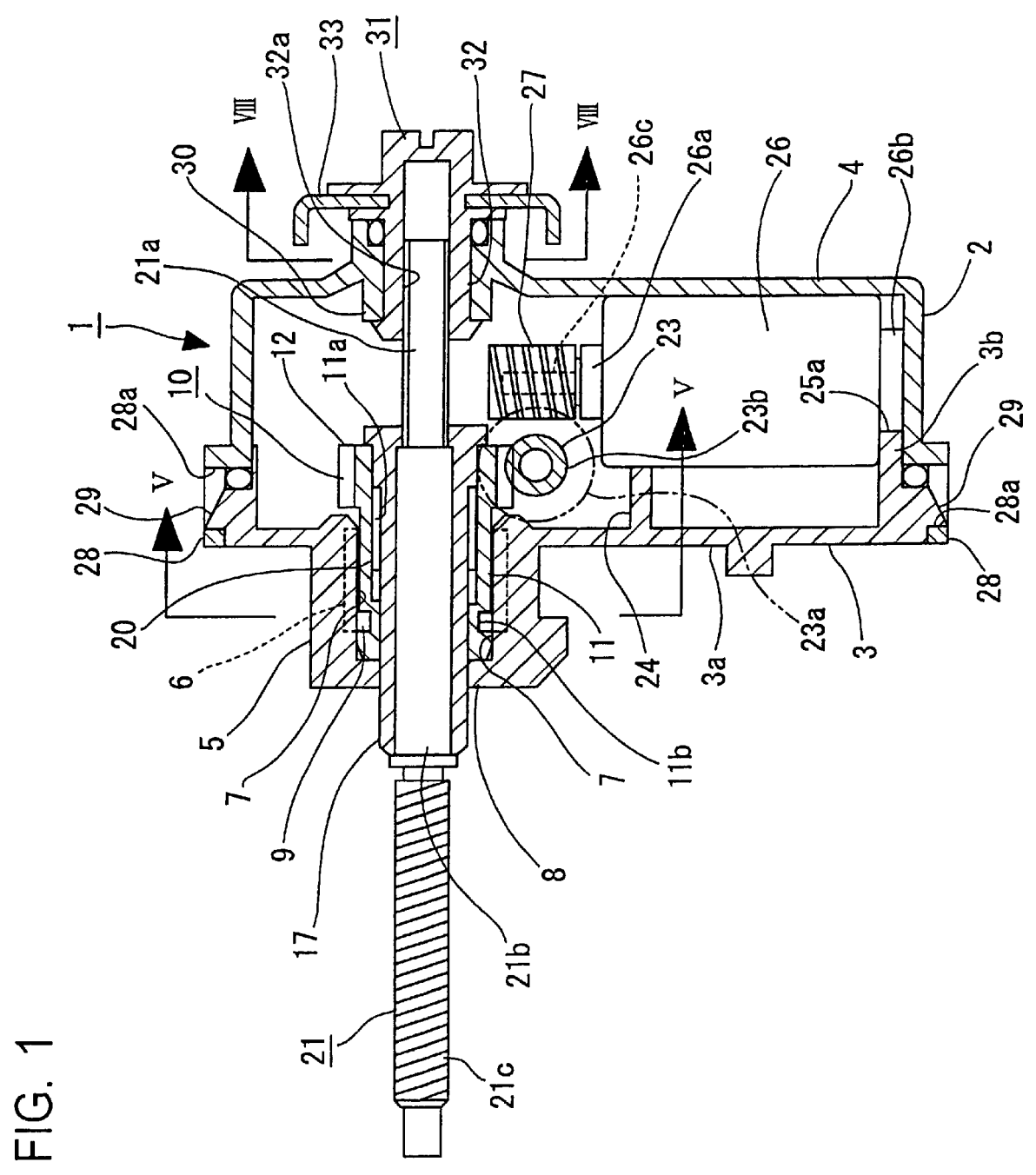

FIG. 1 shows, together with FIGS. 2 through 10, a first embodiment of a beam angle adjusting device for a vehicular headlamp according to the present invention, with the FIG. 1 being a longitudinal sectional view.

DESCRIPTION OF THE PREFERRED EMBODIMENTS

Figure 2:
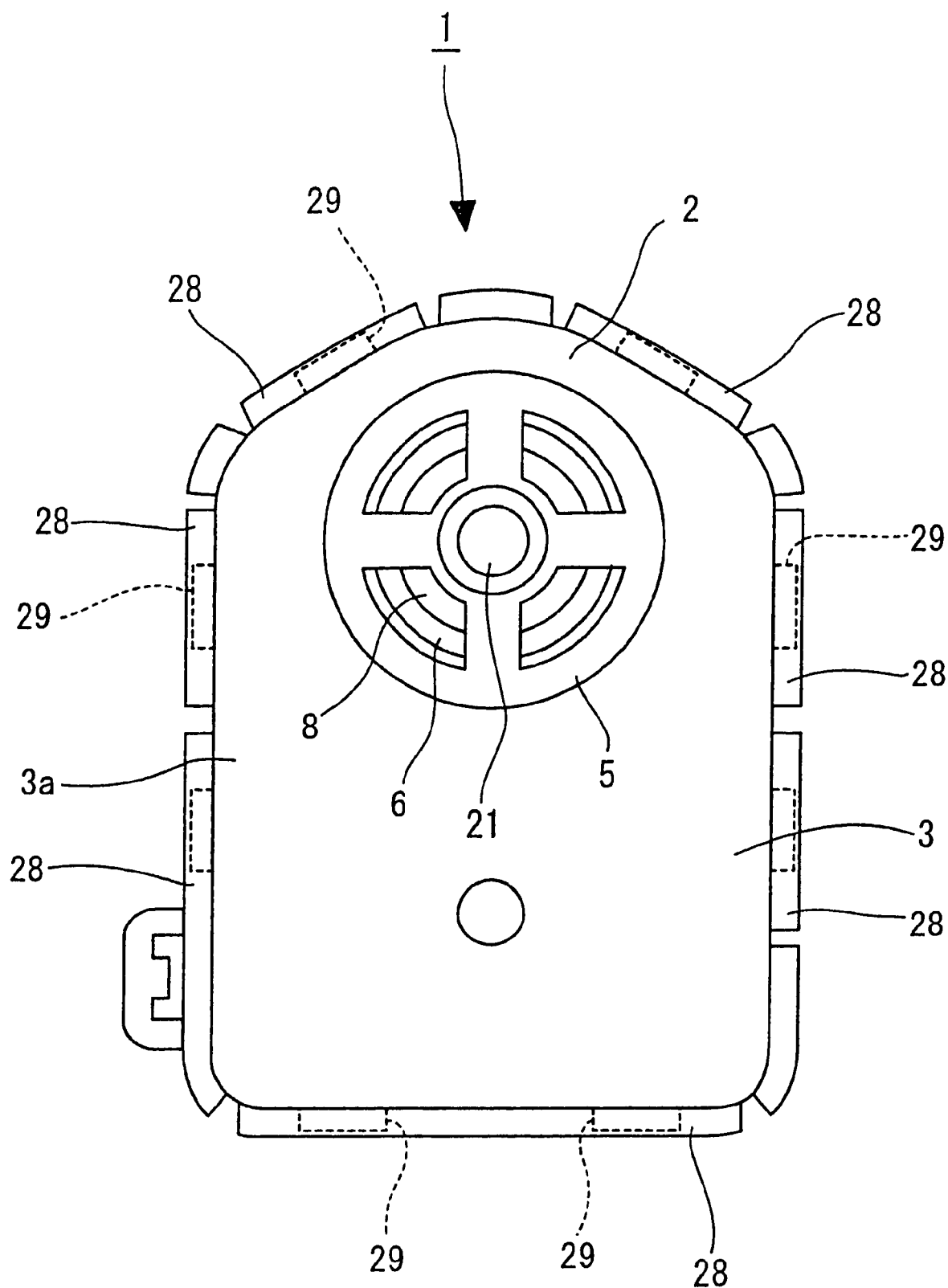
FIG. 2 is a front view of the beam angle adjusting device of FIG. 1.
Figure 3:
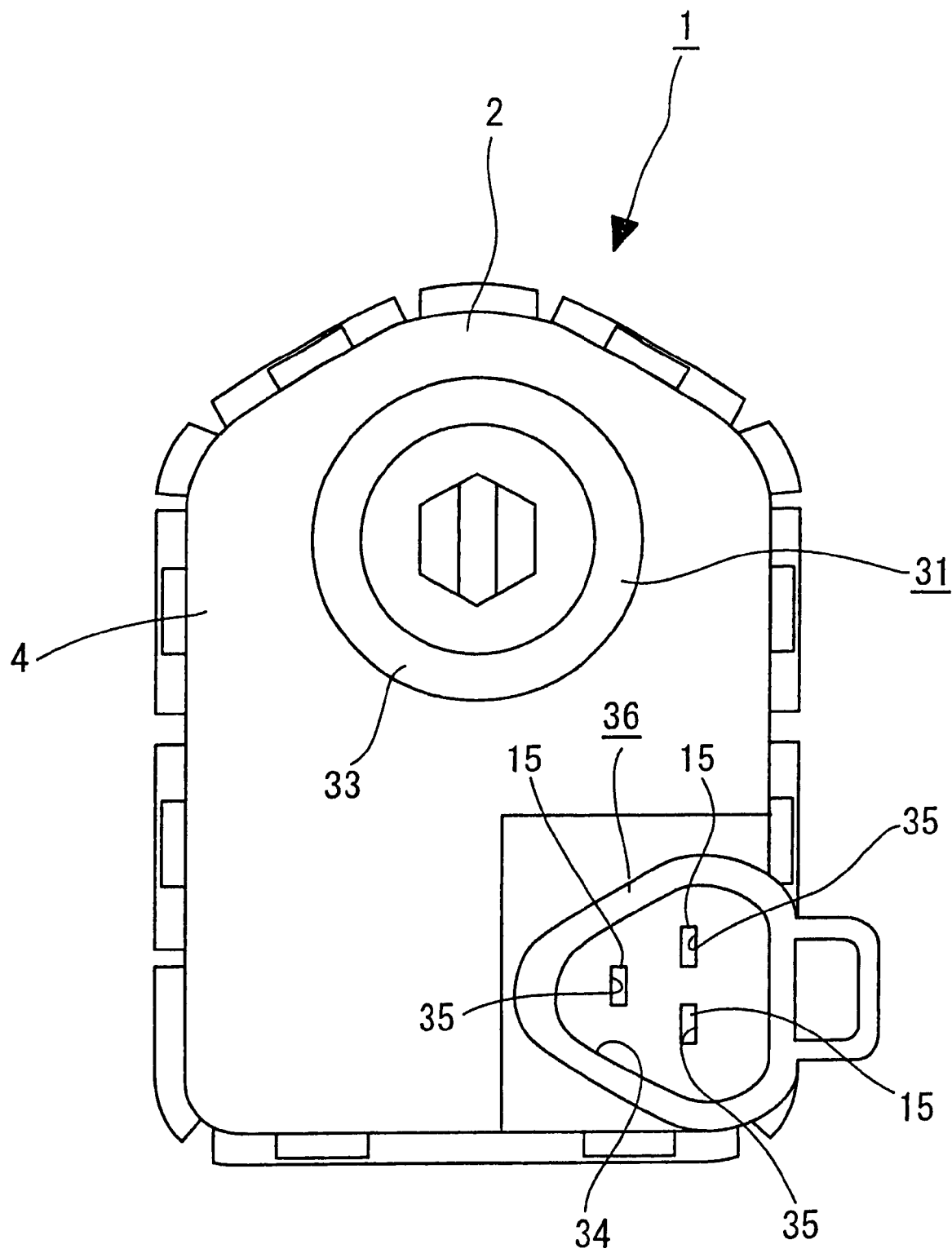
FIG. 3 is a rear view of the beam angle adjusting device of FIG. 1.
Figure 4:
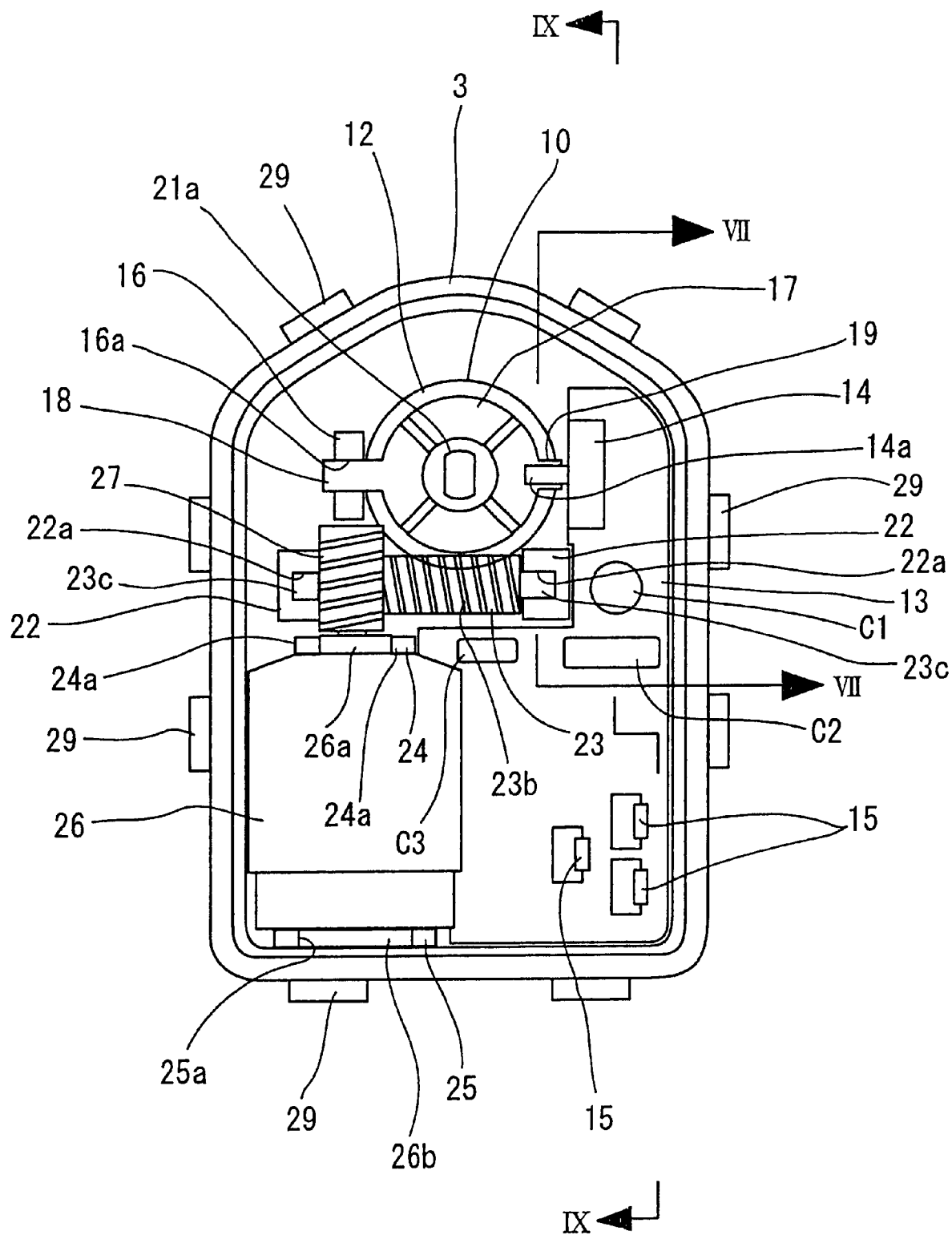
FIG. 4 a rear view of the beam angle adjusting device of FIG. 1 with the rear case removed.
Figure 5:
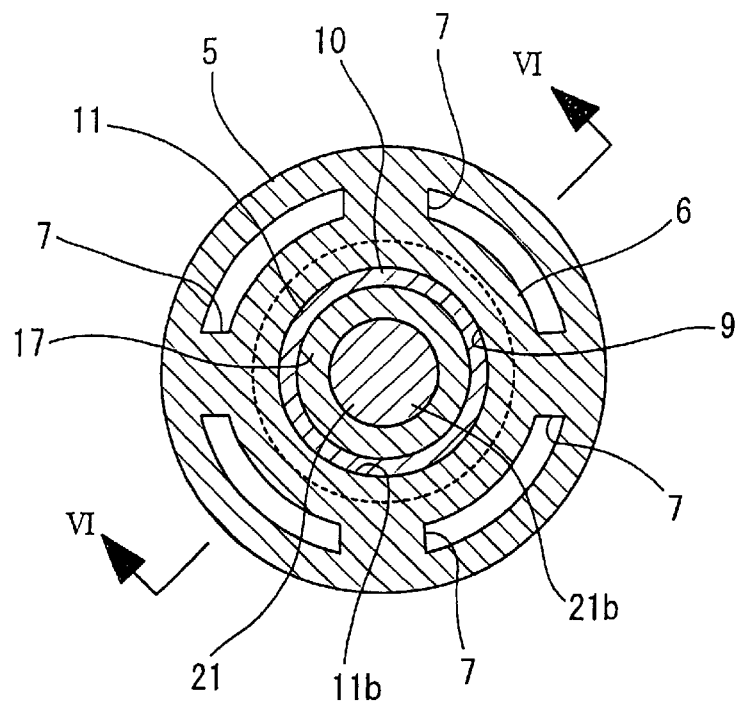
FIG. 5 is an enlarged sectional view taken along line V—V in FIG. 1.
Figure 6:
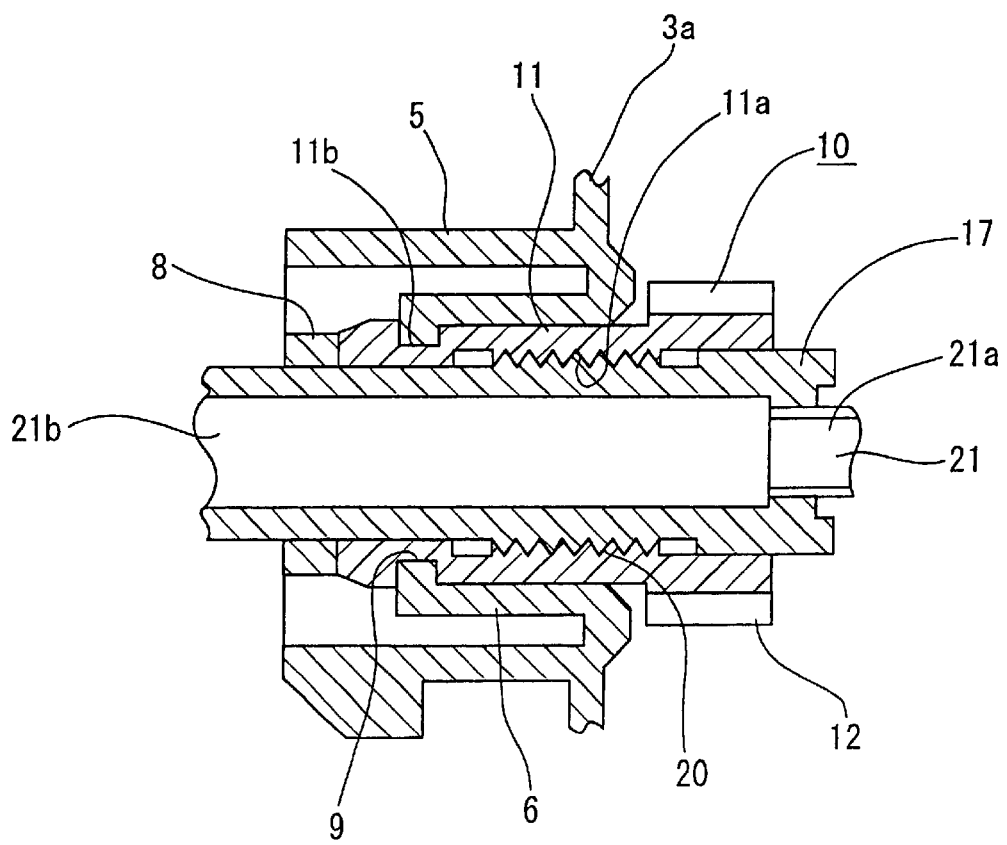
FIG. 6 is a sectional view taken along line VI—VI in FIG. 5.
Figure 7:
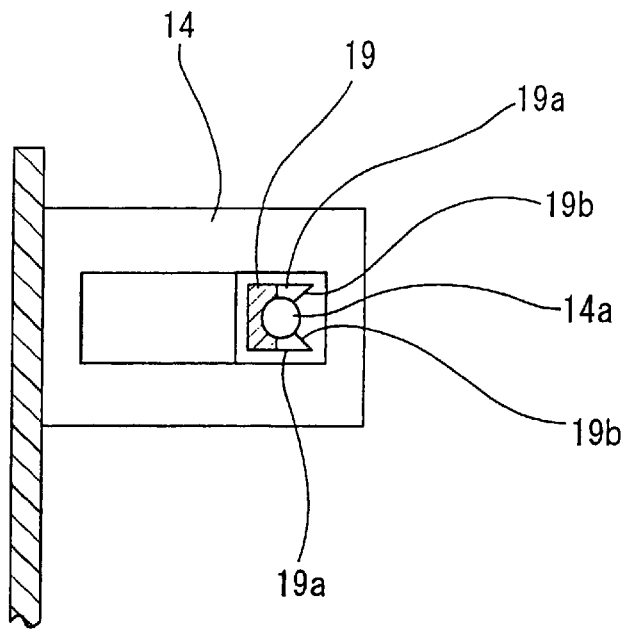
FIG. 7 is an enlarged sectional view taken along line VII—VII in FIG. 4.
Figure 8:
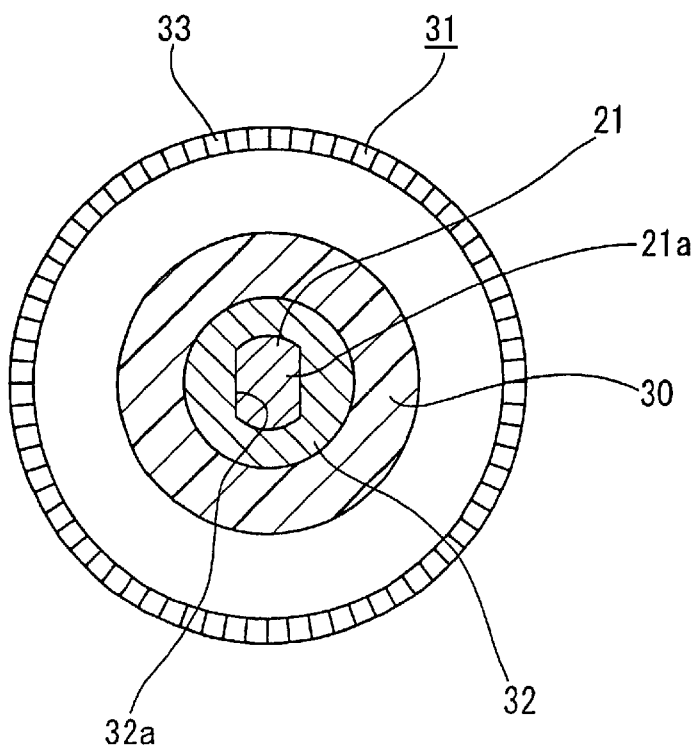
FIG. 8 is an enlarged sectional view taken along line VIII—VIII in FIG. 1.
Figure 9:
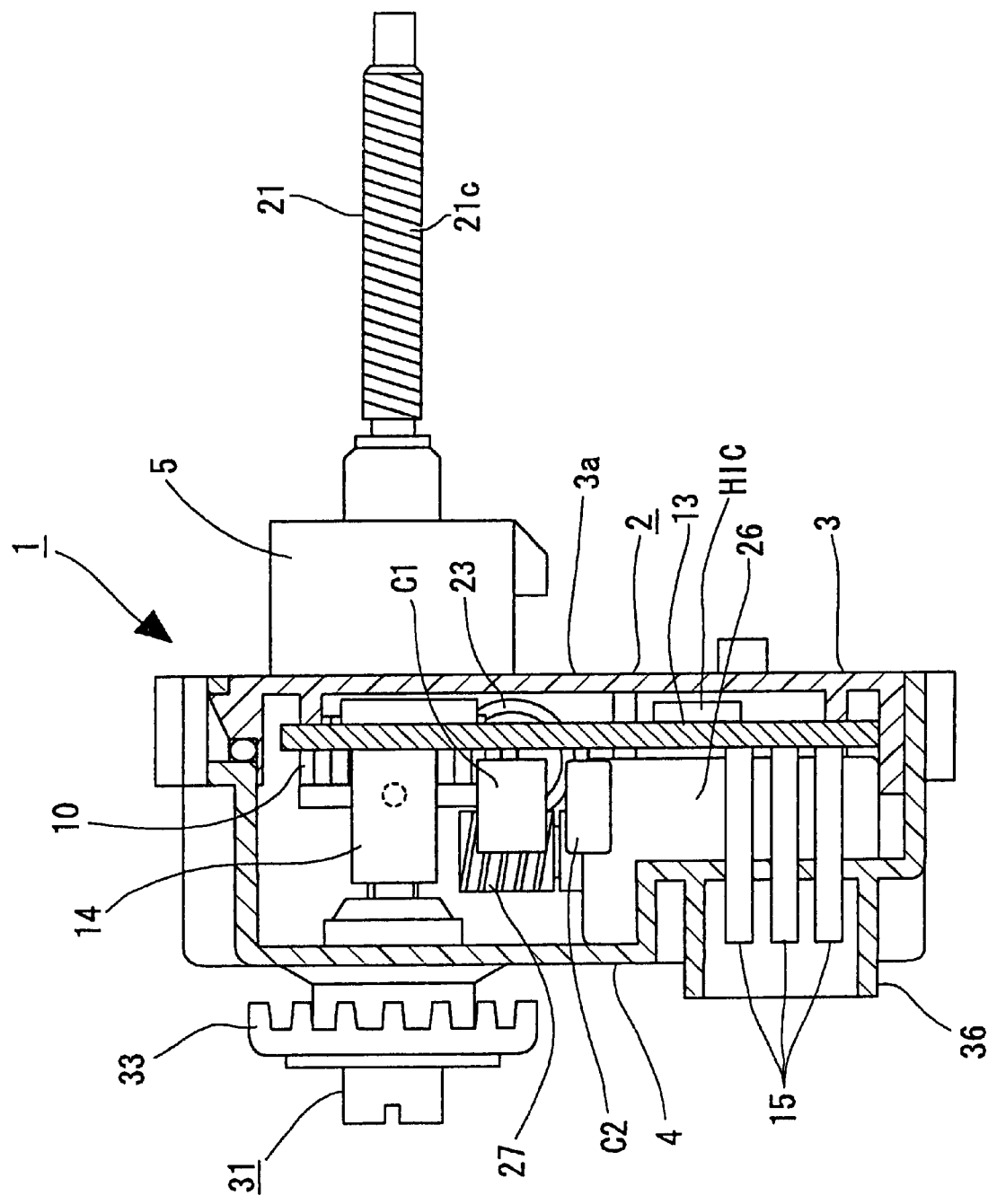
FIG. 9 is a sectional view taken along line IX—IX in FIG. 4.
Figure 10:
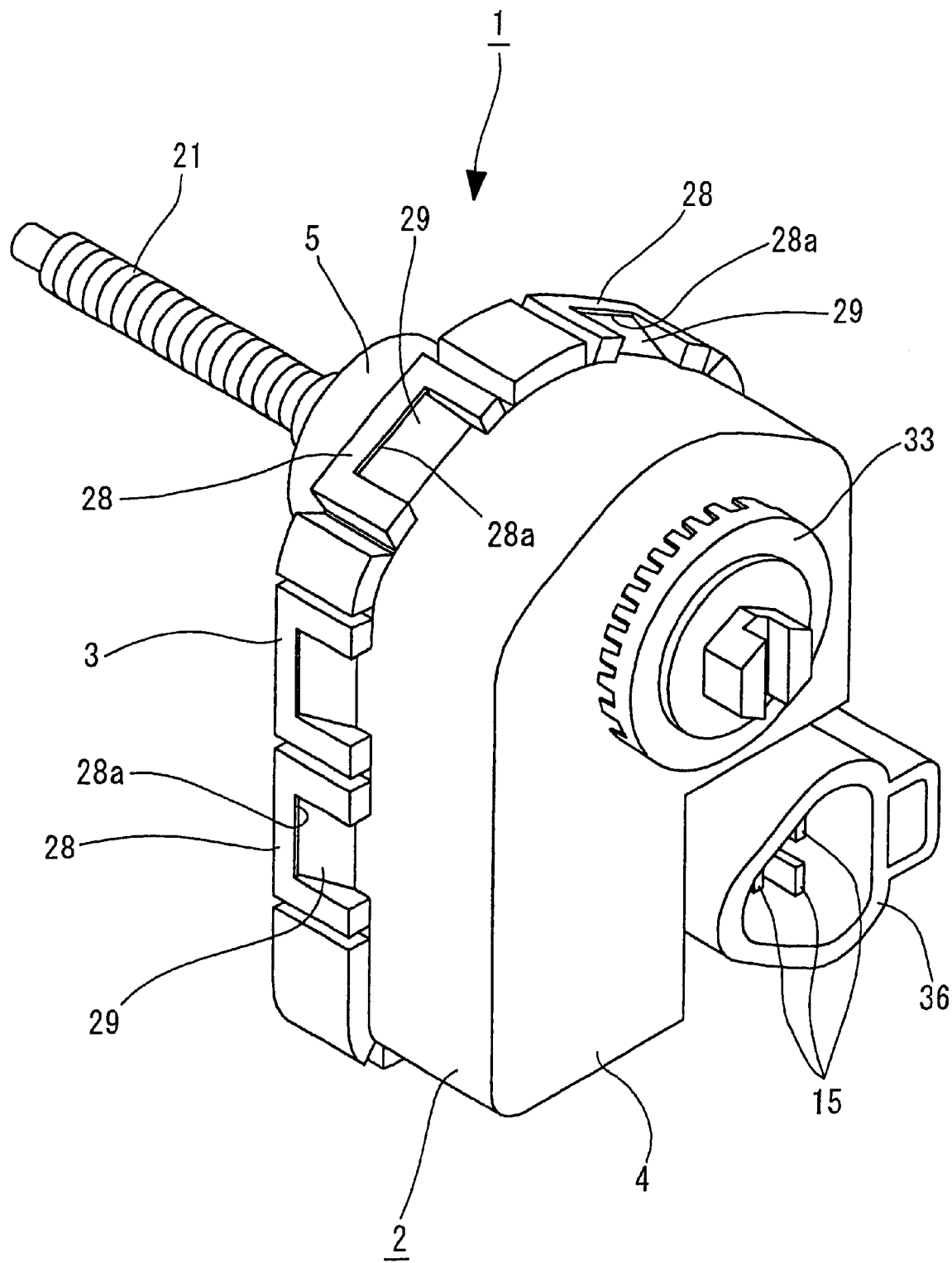
FIG. 10 is a perspective view of the beam angle adjusting device of FIG. 1 as seen from the rear side.

Preferred embodiments of a beam angle adjusting device for a vehicular headlamp of the present invention will hereinafter be described with reference to the attached drawings.

FIGS. 1 through 10 show a first embodiment of a beam angle adjusting device for a vehicular headlamp of the present invention.

The beam angle adjusting device 1 has a case body 2 within which various parts are accommodated.

The case body 2 is divided into two portions in the front/rear direction, thereby defining a front case 3 and a rear case 4.

The front case 3 has a generally rectangular shaped plate-like front face portion 3a and a low peripheral wall portion 3b projecting rearward from a peripheral edge of the front face portion 3a. A cylindrical projection 5 having a generally cylindrical shape projects from a position offset to one side in the longitudinal direction of the front case On the inside of the cylindrical projection 5, an inside cylinder portion 6 is formed slightly apart from the cylindrical projection 5. The front end of the inside cylindrical portion 6 terminates slightly behind a front end of the cylindrical projection 5. Spaces between the inside cylinder portion 6 and the cylindrical projection 5 are connected by ribs 7 formed at equal distances in the circumferential direction, which extend up to the front end of the cylindrical projection 5. Further, an annular body 8 having a smaller diameter than the inside cylinder portion 6 is formed so as to connect the tips of the ribs 7. At a tip portion of the inside cylinder portion 6, an engaging rib 9 projecting inward is formed.

A worm wheel 10 is composed of a wheel portion 12 formed integrally on the rear end of a cylindrical body 11. Thread grooves 11a are formed on the inside surface of the cylindrical body 11. Further, engaging grooves 11b extending annularly are formed on the outer surface of a tip portion of the cylindrical body 11. In the worm wheel 10, the cylindrical body 11 is inserted into the inside cylindrical portion 6 of the front case 3 from behind. The engaging groove 11b formed on the outer surface of the tip portion of the cylindrical body 11 slidably engages with the engaging ribs of the inside cylindrical portion 6. Accordingly, the worm wheel 10 is supported by the front case 3 rotatably but immovable in the front/rear direction.

A printed circuit board 13 is disposed inside the front case 3. The printed circuit board 13 has generally an L-shape, as viewed from the rear, and is disposed inside the front case 3 on generally the right-hand side thereof. A slide-type variable resistor 14 is attached to the printed circuit board 13, and three terminal strips 15 project from the bottom right-hand portion as viewed from the rear. The slide-type variable resistor 14 is located at a position near the wheel portion 12 of the worm wheel 10. A slider is located so that it moves in the front/rear direction, while a connecting projection 14a of the slider projects toward the position of the worm wheel 10.

Electronic components other than the slide-type variable resistor 14 are also mounted on the printed circuit board 13. Electronic components, such as capacitors C1, C2, C3, and the slide-type variable resistor 14, having relatively greater heights are mounted on the rear side of the printed circuit board 13 where the clearance between the rear case 4 and the board is large. On the other hand, electronic components with relatively lesser heights, such as a hybrid IC (HIC), are mounted on the front side of the printed circuit board 13 where the clearance between the board and a front face portion 3a of the front case 3 is small (see FIG. 9).

A guide portion 16 is formed integrally with the front case 3 such that the guide portion 16 projects rearward from a position opposite the slide-type variable resistor 14 with the worm wheel 10 sandwiched therebetween. The guide portion 16 is provided with a guide slit 16a forked in portions except for a base terminal portion and open at the rear end.

An adjusting screw supporting shaft 17 has a long cylindrical shape in the front/rear direction, and a guiding arm 18 projects to the side from the rear end portion. A connecting arm 19 projects on the side opposite the portion where the guiding arm 18 on the rear end portion projects. From a tip end portion of the connecting arm 19, two retaining pieces 19a project rearward in parallel with one another. Retaining ratchets 19b project from tip end portions of the retaining pieces 19a on opposing surfaces thereof.

Threads 20 are formed on an external surface of the adjusting screw supporting shaft 17 on substantially the rear-half portion thereof.

An adjusting screw 21 is retained by the shaft 17. A rear end portion 21a of the adjusting screw 21 has a generally oval-shaped cross section. The remaining rear-half portion 21b is a retained portion having a cylindrical shape, while a remaining front-half portion 21c is a screw shaft portion. The retained portion 21b is inserted into the adjusting screw supporting shaft 17 so as to be rotatably supported.

As described above, the threads 20 of the adjusting screw supporting shaft 17 rotatably supporting the adjusting screw 21 are threadedly joined to the thread grooves 11a of the worm wheel 10. The guiding arm 18 of the adjusting screw supporting shaft 17 slidably engages the guide groove 16a of the guide portion 16 of the front case 3, whereby the adjusting screw supporting shaft 17 is made movable in the front/rear direction but is non-rotatable. Further, the connecting projection 14 of the slider of the slide-type variable resistor 14 is retained between two retaining pieces 19a of the connecting arm 19 of the shaft 17. The connecting projection 14a is prevented from slipping out from between the two retaining pieces 19a, by retaining ratchets 19b.

Near the position where the worm wheel 10 of the front case 3 is located, two bearing portions 22 with a predetermined distance provided therebetween project rearward. On opposing surfaces of the bearing portions 22, U-shaped receiving recessed portions 22a open to the rear are formed.

A worm gear member 23 has a worm wheel portion 23a on one end portion thereof, while the rest of that portion is formed as a worm gear portion 23b. Shaft portions 23c project from both ends of the worm gear portion 23b. The shaft portions 23c of the worm member 23 are separately supported by the receiving recessed portions 22a of the bearing portions 22. Accordingly, the shaft members 23c are rotatably supported in the front case 3, while the worm gear portion 23b engages the wheel portion 12 of the wheel 10.

Two motor support portions 24, 25 project from a lower left-hand portion as viewed from the rear of the front case 3. One motor support portion 24 is disposed at a position near one of the bearing portions 22, and is provided with two supporting arms 24a extending in parallel. The other motor support portion 25 is formed at a position spaced apart from the motor support portion 24, and is provided with a receiving portion 25a which is generally U-shaped and open at a rear end thereof.

A motor 26 has projections 26a and 26b on both end portions thereof. One projection 26a is clampingly supported by the supporting arms 24a of one motor support portion 24, whereas the other projection 26b is supported by the receiving portion 25a of the other motor support portion 25. In this manner, the motor 26 is supported on the front case 3. Thus, the motor 26 is disposed on a left-hand portion of a bottom-half portion of the front case, that is, to the left side of a position where a lower-half portion of the printed circuit board 13 is located, and parallel with the printed circuit board 13.

A worm gear 27 is fixed to a motor shaft 26c of the motor 26. When the motor 26 is attached to the front case 3 as described above, the worm gear 27 engages the worm wheel portion 23a of the worm member 23.

The rear case 4 is shaped so as to cover the rear portion of the front case 3. A plurality of engaging pieces 28 project forward from the outer side of the front end, with engaging holes 28a being formed in the engaging pieces 28.

A plurality of engaging projections 29 project from the external face of the peripheral wall portion 3b of the front case 3. When the rear end of the peripheral wall portion 3b of the front case 3 is abutted against the front end of the rear case 4, the engaging projections 29 of the front case 3 engage the engaging holes 28a of the rear case 4. Consequently, the front case 3 and the rear case 4 are connected.

A cylinder portion 30 is formed at a position on a rear case 4 corresponding to the cylindrical projection 5 formed in the case 3.

An adjusting gear body 31 includes a cylindrical portion 32 and a crown gear portion 33 integrally provided at a rear end portion of the cylindrical portion 32. The cylindrical portion 32 is rotatably supported by the cylinder portion 30 of the rear case 4, and the crown gear portion 33 is located outside the rear case 4. A connecting hole 32a open at a front end thereof is formed in the cylindrical portion 32, and the connecting hole 23a has a generally oval-shaped cross section.

Further, when the front case 3 supporting the worm wheel 10 and the rear case 4 supporting the adjusting gear body 31 are engaged as described above, the rear end portion 21a of the adjusting screw 21 is inserted into the connecting hole 32a of the adjusting gear body 31. Accordingly, the adjusting screw 21 is made non-rotatable with respect to the adjusting gear body 31 but movable in the axial direction.

A recessed portion 34 open to the rear is formed at a right-hand bottom-side portion of the rear case 4 as viewed from the rear. Insertion holes 35 are formed at a bottom portion of the recessed portion 34. When the front case 3 and the rear case 4 are connected as described above, projectingly disposed terminal strips 15 on the printed circuit board 13 supported by the front case 3 are inserted through respective ones of the insertion holes 35 so as to be located inside the recessed portion 34, where a connector portion 36 is formed.

The beam angle adjusting device 1 as described above is, for example, fixed to a housing of a vehicular headlamp. The screw shaft portion 21c of the adjusting screw 21 is screwed onto a nut supported at the front, tilting end of a reflector (tilting member) tiltably supported in the housing.

Further, for example, a tip of a Phillips-head screwdriver is engaged with the crown gear portion 33 of the above-described adjusting gear body 31, such that the adjusting gear body 31 is rotated when the screwdriver is turned. Accordingly, the adjusting screw 21 is rotated. When the adjusting screw 21 is rotated, the screw shaft portion 21c is screwed in or unscrewed with respect to the above-described nut. This causes the portion of the tilting member supporting the nut to move forward and rearward, which then inclines the tilting member to change the irradiation angle of the vehicular headlamp.

The motor 26 is driven when the irradiation angle is controlled remotely. When the motor 26 is driven, the worm wheel 10 is rotated via the worm gear 27 fixed to the motor shaft 26c, the worm wheel portion 23a of the worm member 23, and the worm gear portion 23b of the worm member 23. Rotation of the worm wheel 10 causes the adjusting screw supporting shaft 17, the threads 20 of which are engaged with the thread grooves 11a of the worm wheel 10, to move forward or rearward. As a result, the adjusting screw 21 supported by the adjusting screw supporting shaft 17 is moved forward or rearward, which in turn moves the portion of the tilting member that retains the nut in the front/rear direction. Consequently, the tilting member tilts so as to change the irradiation angle of the vehicular headlamp. Also, movement of the adjusting screw supporting shaft 17 in the front/rear direction causes the slider of the slide-type variable resistor 14 to move in the front/rear direction, which changes the resistance value of the slide-type variable resistor 14. Accordingly, sensing the change in the resistance value allows the position of the adjusting screw 21 or the irradiation angle to be detected.

In the beam angle adjusting device 1 for a vehicular headlamp as described above, the printed circuit board 13 having connector terminal strips 15 is disposed parallel to the motor 26 substantially in the same plane. Therefore, the case body 2 can be made small, especially the depth; that is, the size in the front/rear direction can be reduced. Further, the terminal strips 15 do not project far rearward from the rear end of the motor 26. Moreover, because the recessed portion 34 in which the terminal strips 15 are disposed is formed by recessing one portion of the rear case 4 forward, the connector 36 so constructed does not greatly project rearward from the rear face of the rear case 4. As a result, the longitudinal length of the case body 2 can be made extremely small.

Figure 11:
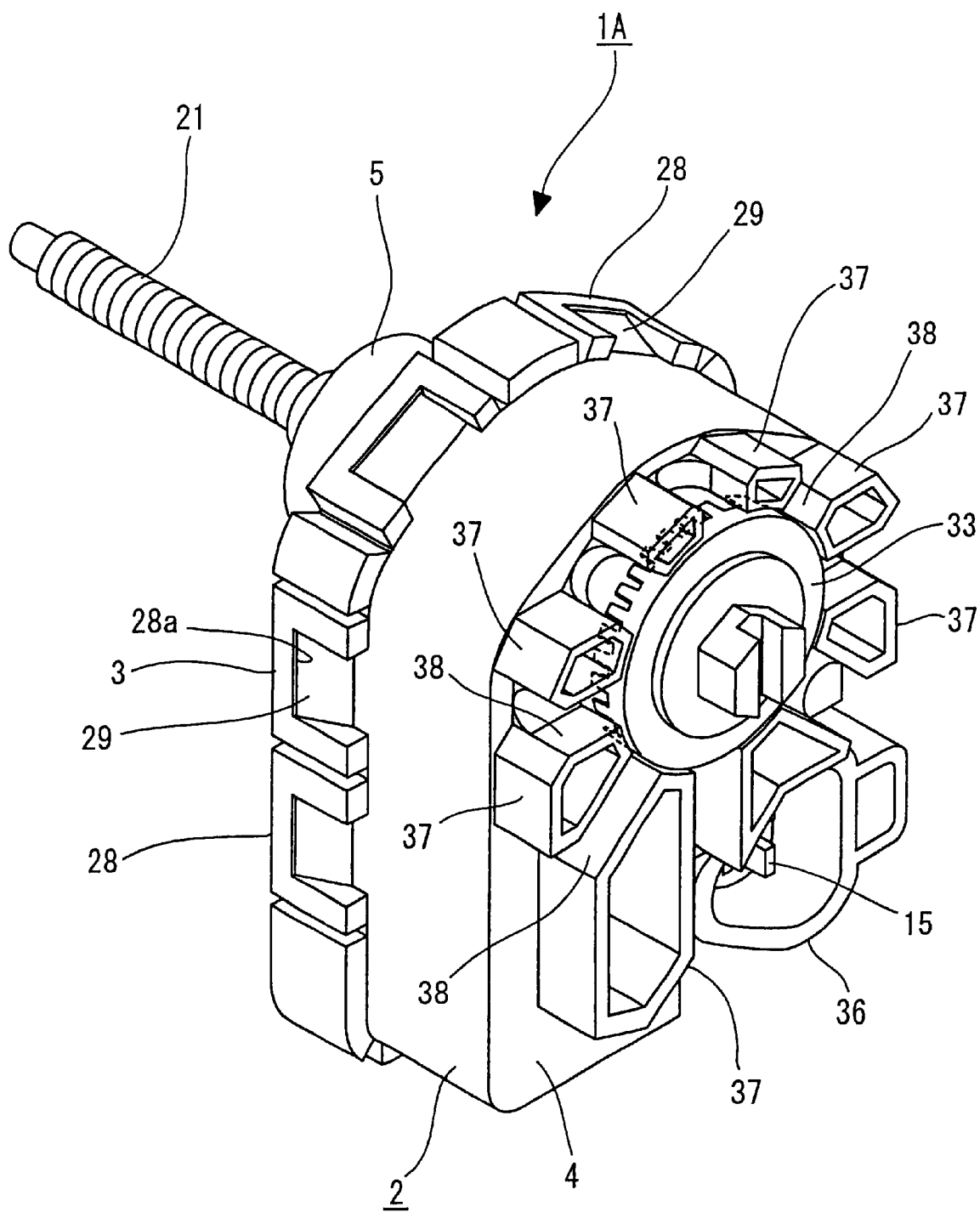
FIG. 11 shows, together with FIG. 12, a second embodiment of a beam angle adjusting device for a vehicle according to the present invention, with FIG. 11 being a perspective view as seen from the rear side.
Figure 12:
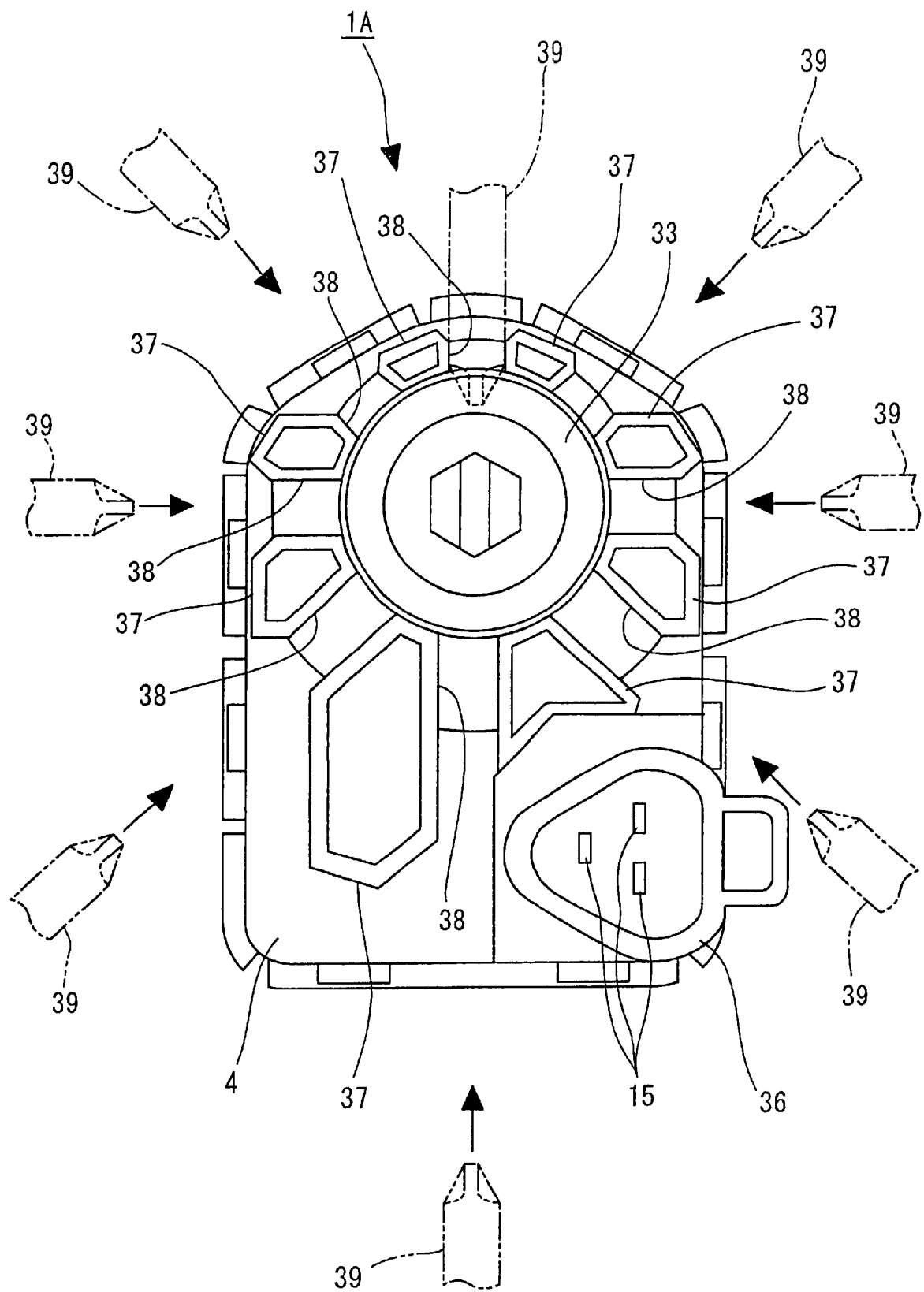
FIG. 12 is a rear view of the beam angle adjusting device of FIG. 1.

FIG. 11 and FIG. 12 show a second embodiment 1A of the beam angle adjusting device for a vehicular headlamp according to the present invention.

This beam angle adjusting device 1A is provided with cylindrical rear projections 37 of undefined shape on the rear face of the rear case 4 of the case body 2. Other features are the same as those for the first embodiment.

Through provision of the rear projections 37 eight narrow passages 38 extending radially from a center, which is the center of the crown gear portion 33, are formed, as seen from the rear face (see FIG. 12). Accordingly, when rotating the adjusting screw 21 by hand, reaching the crown gear portion 33 with the tip of a tool such as a Phillips-head screwdriver 39 along one of the passages 38 enables easy engagement of the jig tip with the crown gear portion 33.

Rear ends of the rear projections 37 are substantially at the same positions as the rear end of the crown gear portion 33. The rear projections 37 prevent foreign matter from hitting against portions that project outward from the rear face of the rear case 4a of the crown gear body 31.

Figure 13:
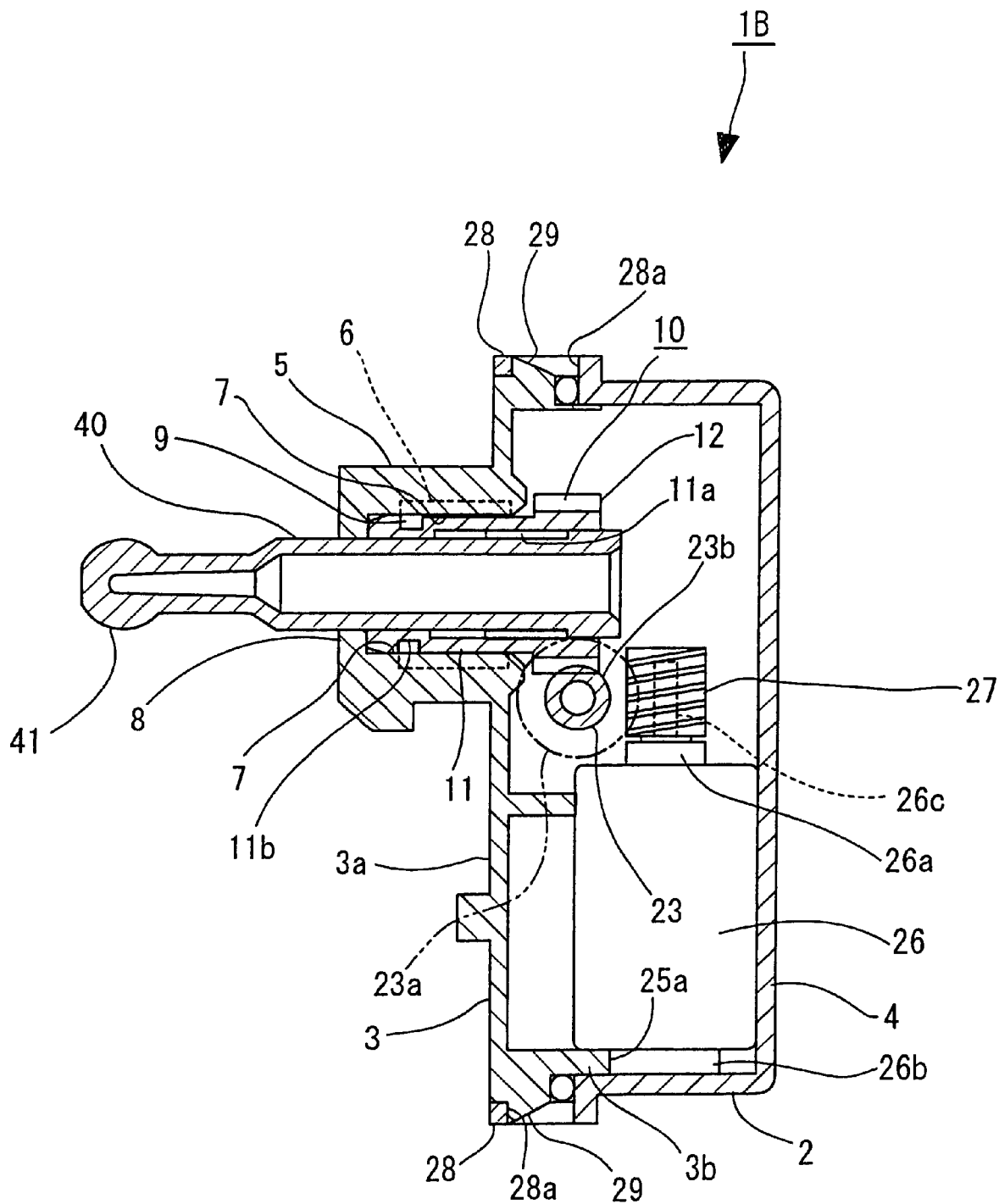
FIG. 13 shows, together with FIG. 14, a third embodiment of a beam angle adjusting device for a vehicle according to the present invention, with FIG. 13 being a longitudinal sectional view.
Figure 14:
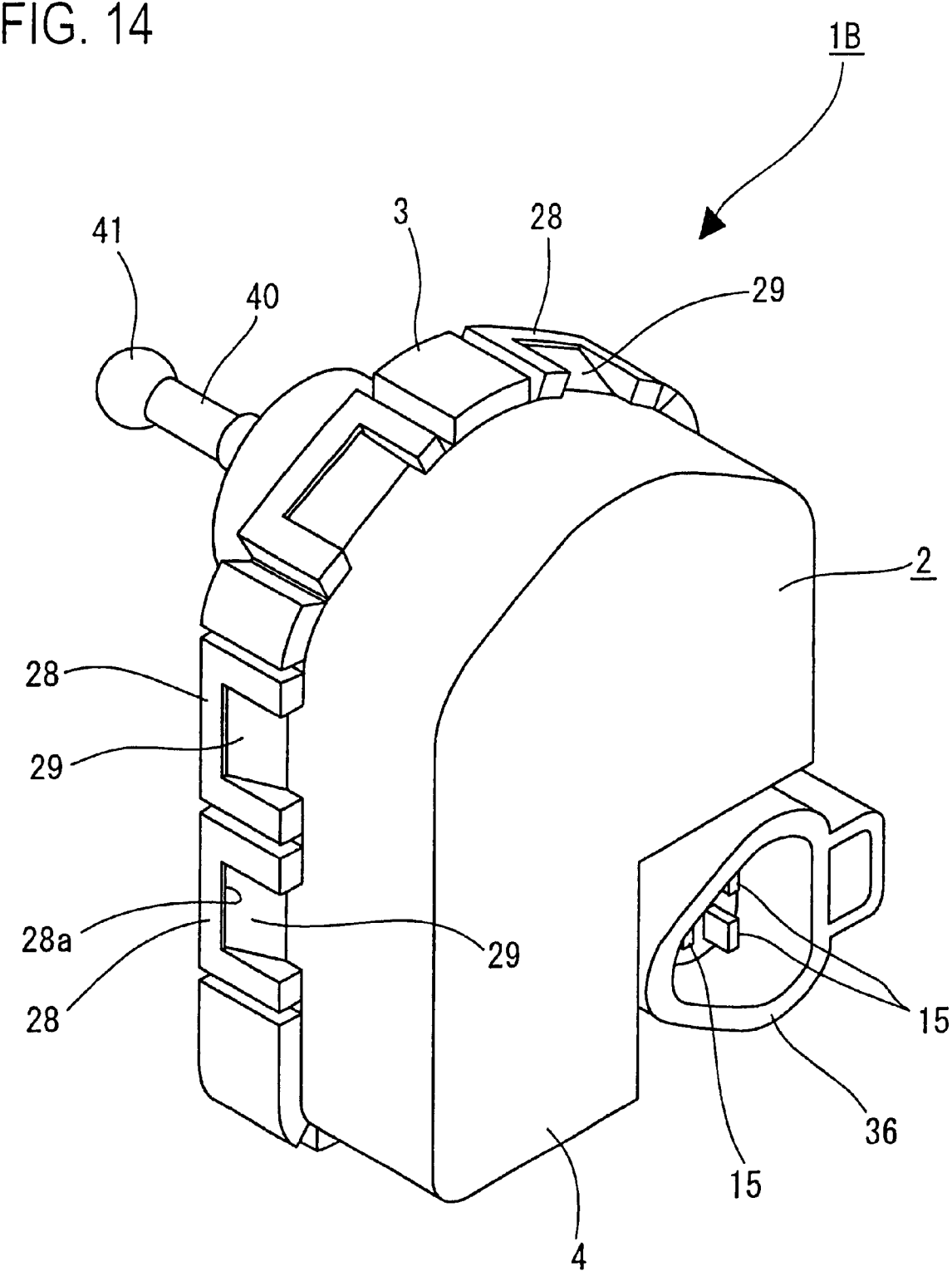
FIG. 14 is a perspective view of the beam angle adjusting device of FIG. 13 as seen from the rear side.

FIGS. 13 and 14 show a third embodiment of the beam angle adjusting device for a vehicular headlamp according to the present invention. The beam angle adjusting device 1B for a vehicular headlamp according to this embodiment differs from the above-described beam angle adjusting devices 1 and 1A in that it does not contain an adjusting screw.

That is, an adjusting shaft 40 screwed to the worm wheel 10 differs from the adjusting screw supporting shaft 17 of the above-described beam angle adjusting device 1 in that it contains a spherical portion 41 at the tip thereof, and in that it does not contain a hole for supporting the adjusting screw. The other structure is the same as the above-described adjusting screw supporting shaft 17, and thus further drawings and descriptions of the identical portions are omitted.

The spherical portion 41 provided at the tip of the adjusting shaft 40 is connected in the form of a ball joint to a ball bearing member provided at a tilting end portion of a reflector (tilting member).

The motor 26 is driven to allow the irradiation angle to be controlled remotely. When the motor 26 is driven, the worm wheel 10 is rotated via the worm gear 27 fixed to the motor shaft 26c, the worm wheel portion 23a of the worm member 23, and the worm gear portion 23b of the worm member 23. Rotation of the worm wheel 10 causes the shaft 40, the threads of which are engaged with the thread grooves 11a of the worm wheel 10, to move forward or rearward. Consequently, the tilting end portion of the tilting member supporting the ball bearing member, to which the spherical portion 41 of the shaft 40 is connected in the form of a ball joint, moves forward. This causes the tilting member to tilt, which in turn changes the irradiation angle of the vehicular headlamp. Also, the movement of the shaft 40 in the front/rear direction causes the slider of the slide-type variable resistor 14 to move in the front/rear direction, which changes the resistance value of the slide-type variable resistor 14. Therefore, the position of the shaft 40, that is, the irradiation angle, can be detected by sensing the change in resistance value.

The shape and structure of each element shown in each of the above-described embodiments represent only one of various examples used in the implementation of the present invention. Therefore, the scope of the present invention shall not be construed to be limited to the foregoing embodiment.

As it is clear from the above description, the beam angle adjusting device for a vehicular headlamp of the present invention includes a case body, a motor disposed inside the case body, and a shaft which moves in the front/rear direction in response to rotation of the motor, and is characterized in that the motor and a circuit member which has at least one terminal for supplying power are disposed in symmetrical positions in relation to a plane containing the shaft.

Accordingly, in the beam angle adjusting device for a vehicular headlamp of the present invention, the case body can be made small due to the fact that the motor and the printed circuit are disposed side by side. Also, because the heights of the terminal for supply of power and the motor can be made the same, the thickness of the case body can be reduced.

Further in accordance with the invention, the circuit member comprises a printed circuit board and electronic components disposed thereon, and the printed circuit board is disposed close to the case body so that the electronic components face toward the inside of the case body. Since the tip of the aforementioned terminal is disposed side by side with the motor, the connector holding the terminal does not project to the rear, which allows the size of the case body to be reduced in the front/rear direction.

Rotation of the motor may be transmitted to the shaft through a worm member screw-fitted to a rotational shaft of the motor and which extends perpendicular to the aforementioned plane and parallel to the case, and a worm wheel having a wheel portion screw-fitted to the worm member and which is coaxial with the aforementioned shaft. Accordingly, the rotational shaft of the motor and the shaft are disposed close to each other, such that the gear construction is made compact and the size of the case body is reduced.

The case body may form a vertex with the shaft, and four other vertices are formed by the motor and the circuit, board resulting in a generally pentagonal shape, so that the space inside the case body is efficiently used, which leads to a reduction in the size of the case body.

It should further be apparent to those skilled in the art that various changes in form and detail of the invention as shown and described above may be made. It is intended that such changes be included within the spirit and scope of the claims appended hereto.

What is claimed is:

1. A beam angle adjusting device for a vehicular headlamp comprising:
   a case body,
   a motor disposed inside said case body,
   a shaft movable in a first direction of said case body in response to rotation of said motor, and
   a circuit member having at least one terminal for supplying power, said motor and said circuit member being arranged symmetrically in relation to a plane containing said shaft,
   wherein said circuit member comprises a printed circuit board and electronic components disposed on said circuit board, and said printed circuit board is disposed closely adjacent to said case body so that at least some of said electronic components face toward the inside of said case body, and
   wherein said at least one terminal extends in a rearward direction with respect to said case, is disposed in a recessed portion formed in said case and terminates prior to extending beyond a rear face of said case.

2. The beam angle adjusting device for a vehicular headlamp according to claim 1, wherein said electronic components comprises a slide-type variable resistor having a slider coupled to said shaft to be moved by said shaft in said first direction.

3. The beam angle adjusting device for a vehicular headlamp according to claim 1, wherein said case body is divided into a front case and a rear case, said printed board being mounted in said front case with a greater clearance being formed between said printed circuit board and said rear case than between said printed circuit board and said front case, ones of said electronic components having a greater height being mounted on a rear side of said printed circuit board.

4. The beam angle adjusting device for a vehicular headlamp according to claim 1, wherein a plane containing said printed circuit board is substantially parallel to a plane containing a rotational shaft of said motor and extending in said first direction of said case body.

5. The beam angle adjusting device for a vehicular headlamp according to claim 1, further comprising a worm member screw-fitted to a rotational shaft of said motor and extending perpendicular to said plane and parallel to an adjacent side of said case, rotation of said motor being transmitted to said shaft movable in said first direction of said case body shaft through said worm member, and a worm wheel having a wheel portion engaged with said worm member and which is coaxial with said shaft movable in said first direction of said case body.

6. The beam angle adjusting device for a vehicular headlamp according to claim 1, wherein said shaft has a spherical portion provided on a tip thereof.

7. The beam angle adjusting device for a vehicular headlamp according to claim 1, further comprising a worm member screw-fitted to a rotational shaft of said motor and extending perpendicular to said plane and parallel to an adjacent side of said case, rotation of said motor being transmitted to said shaft movable in said front/rear direction of said case body shaft through said worm member, and a worm wheel having a wheel portion engaged with said worm member and which is coaxial with said shaft movable in said front/rear direction of said case body.

8. The beam angle adjusting device for a vehicular headlamp according to claim 1, wherein said case body forms a vertex with said shaft movable in said first direction of said case body, and four other vertices are formed by said motor and said circuit board wherein by said case has a generally pentagonal shape.

9. The beam angle adjusting device for a vehicular headlamp according to claim 7, further comprising an adjusting screw received in a longitudinal hole formed in said shaft.

10. The beam angle adjusting device for a vehicular headlamp according to claim 7, wherein said shaft has a spherical portion formed at a tip end thereof.

11. The beam angle adjusting device for a vehicular headlamp according to claim 1, wherein said first direction extends forward and rearward with respect to said case body.

* * * * *